US008977897B2

(12) United States Patent
Tamura et al.

(10) Patent No.: US 8,977,897 B2
(45) Date of Patent: Mar. 10, 2015

(54) COMPUTER-READABLE RECORDING MEDIUM, DATA MANAGEMENT METHOD, AND STORAGE DEVICE

(75) Inventors: Masahisa Tamura, Kawasaki (JP); Yasuo Noguchi, Kawasaki (JP); Toshihiro Ozawa, Yokohama (JP); Munenori Maeda, Yokohama (JP); Tatsuo Kumano, Kawasaki (JP); Ken Iizawa, Yokohama (JP); Jun Kato, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 166 days.

(21) Appl. No.: 13/604,682

(22) Filed: Sep. 6, 2012

(65) Prior Publication Data

US 2013/0138999 A1    May 30, 2013

(30) Foreign Application Priority Data

Nov. 30, 2011    (JP) .................................. 2011-263062

(51) Int. Cl.
*G06F 11/00*    (2006.01)
(52) U.S. Cl.
USPC ............................................. 714/16; 707/610
(58) Field of Classification Search
CPC ............ G06F 11/2056; G06F 11/2064; G06F 11/2082
USPC ............... 714/16, 55; 707/610, 611, 612, 624
See application file for complete search history.

(56) References Cited

U.S. PATENT DOCUMENTS

| 6,308,284 | B1 * | 10/2001 | LeCrone et al. | 714/6.31 |
|---|---|---|---|---|
| 7,149,919 | B2 * | 12/2006 | Cochran et al. | 714/4.4 |
| 7,430,646 | B2 * | 9/2008 | Cox et al. | 711/162 |
| 7,954,003 | B2 * | 5/2011 | Ikeda et al. | 711/162 |
| 8,533,411 | B2 * | 9/2013 | Agombar et al. | 711/162 |
| 2004/0034808 | A1 * | 2/2004 | Day et al. | 714/6 |
| 2004/0230859 | A1 * | 11/2004 | Cochran et al. | 714/2 |
| 2005/0049945 | A1 * | 3/2005 | Bourbonnais et al. | 705/30 |
| 2005/0071710 | A1 * | 3/2005 | Micka et al. | 714/6 |
| 2005/0081091 | A1 * | 4/2005 | Bartfai et al. | 714/6 |
| 2006/0107098 | A1 * | 5/2006 | Maki et al. | 714/6 |
| 2006/0161737 | A1 * | 7/2006 | Martin et al. | 711/147 |
| 2006/0182050 | A1 * | 8/2006 | Dohm | 370/312 |
| 2008/0021974 | A1 * | 1/2008 | Stanley et al. | 709/214 |
| 2008/0168303 | A1 * | 7/2008 | Spear et al. | 714/6 |
| 2009/0070528 | A1 * | 3/2009 | Bartfai et al. | 711/114 |

(Continued)

OTHER PUBLICATIONS

Robbert van Renesse, et al., "Chain Replication for Supporting High Throughput and Availability," USENIX Association OSDI '04: 6th Symposium on Operating Systems Design and Implementation, pp. 91-104 (2004).

(Continued)

*Primary Examiner* — Marc Duncan
(74) *Attorney, Agent, or Firm* — Fujitsu Patent Center

(57) ABSTRACT

An internode put requesting unit detects a time-out with respect to a put request issued to the next node in the order of a multiplexing chain and notifies a put/get executing unit of the time-out. The put/get executing unit sends an error to the previous node in the order of the multiplexing chain or a client and instructs a put-failed-data synchronizing unit to synchronize data failed to be put, and the put-failed-data synchronizing unit performs a synchronization process. A primary makes other put requests wait until completion of the synchronization process. Furthermore, when having received the error, the client issues a get request to the tail end of the multiplexing chain.

5 Claims, 13 Drawing Sheets

(56) References Cited

U.S. PATENT DOCUMENTS

| | | | |
|---|---|---|---|
| 2010/0088556 A1* | 4/2010 | Ikeda et al. | 714/54 |
| 2012/0254110 A1* | 10/2012 | Takemoto | 707/624 |
| 2013/0080828 A1* | 3/2013 | Sheffield | 714/6.22 |
| 2013/0173538 A1* | 7/2013 | Wilkinson | 707/611 |

OTHER PUBLICATIONS

Jeff Terrace, et al., "Object Storage on CRAQ High-throughput chain replication for read-mostly workloads," In Proc. USENIX Annual Technical Conference, San Diego, CA (Jun. 2009).

* cited by examiner

FIG.9

|        | NODE A ROLES |
|--------|--------------|
| SLOT-1: | PRIMARY      |
| SLOT-2: | TERTIARY     |
| SLOT-3: | SECONDARY    |

|        | NODE B ROLES |
|--------|--------------|
| SLOT-1: | SECONDARY    |
| SLOT-2: | PRIMARY      |
| SLOT-3: | TERTIARY     |

|        | NODE C ROLES |
|--------|--------------|
| SLOT-1: | TERTIARY     |
| SLOT-2: | SECONDARY    |
| SLOT-3: | PRIMARY      |

|        | NODE A PUT-FAILED DATA NAMES |
|--------|------------------------------|
| SLOT-1: | a, b, c, y, z               |
| SLOT-2: | —                           |
| SLOT-3: | moge                        |

|        | NODE B PUT-FAILED DATA NAMES |
|--------|------------------------------|
| SLOT-1: | a, b, c                     |
| SLOT-2: | aa, aaa, abcd               |
| SLOT-3: | —                           |

|        | NODE C PUT-FAILED DATA NAMES |
|--------|------------------------------|
| SLOT-1: | —                           |
| SLOT-2: | aa                          |
| SLOT-3: | xyz, hoge, moge             |

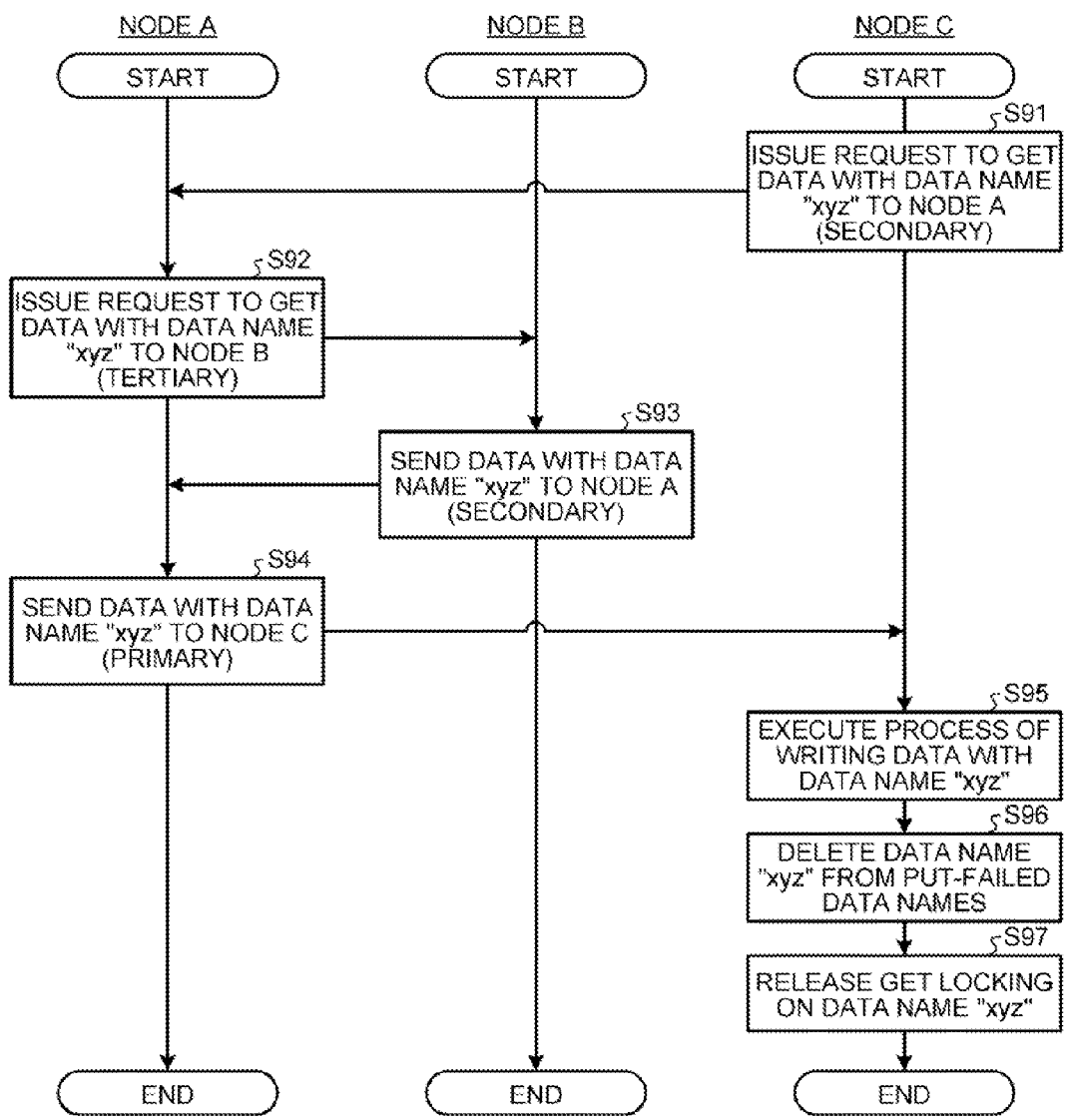

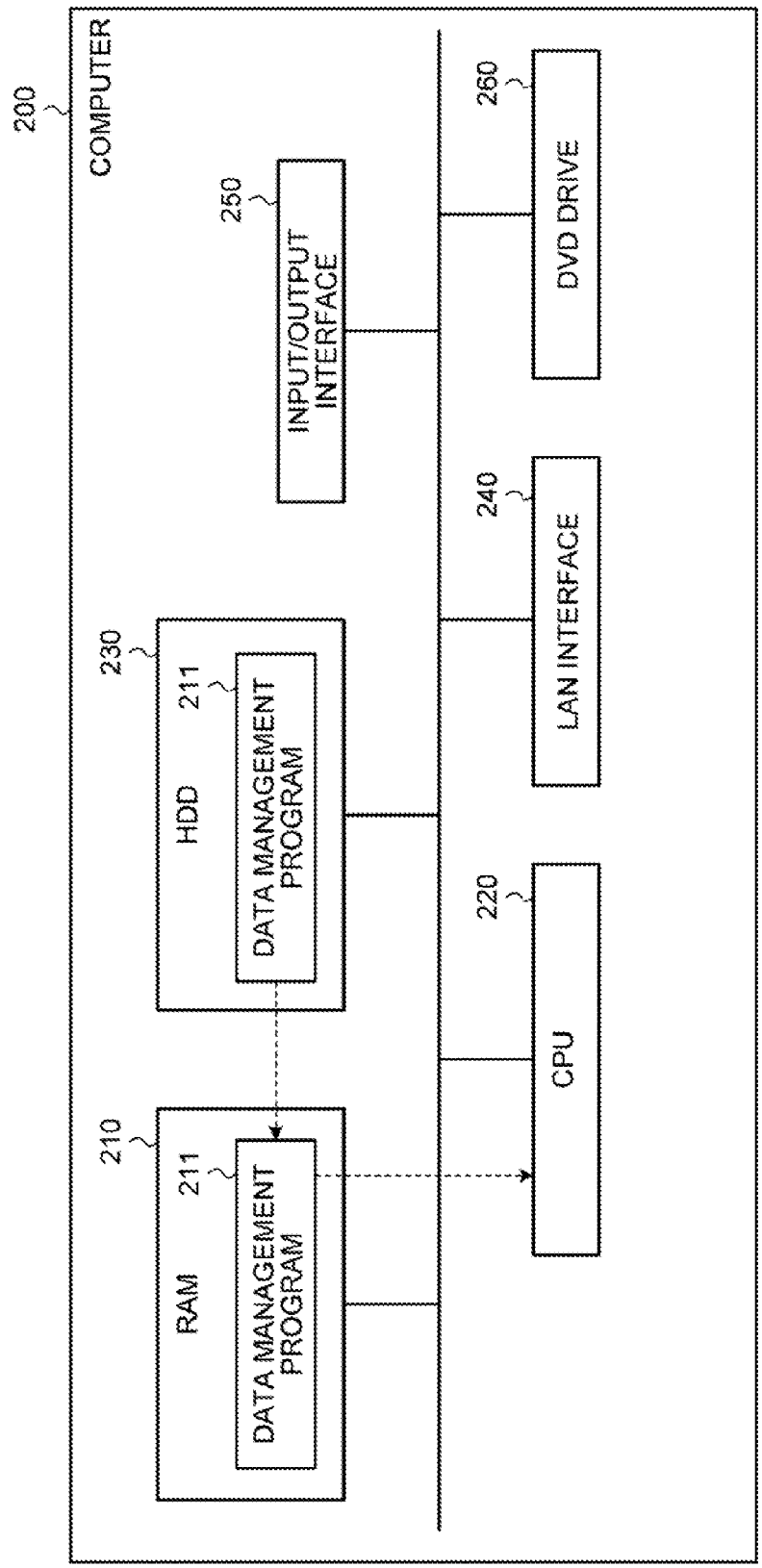

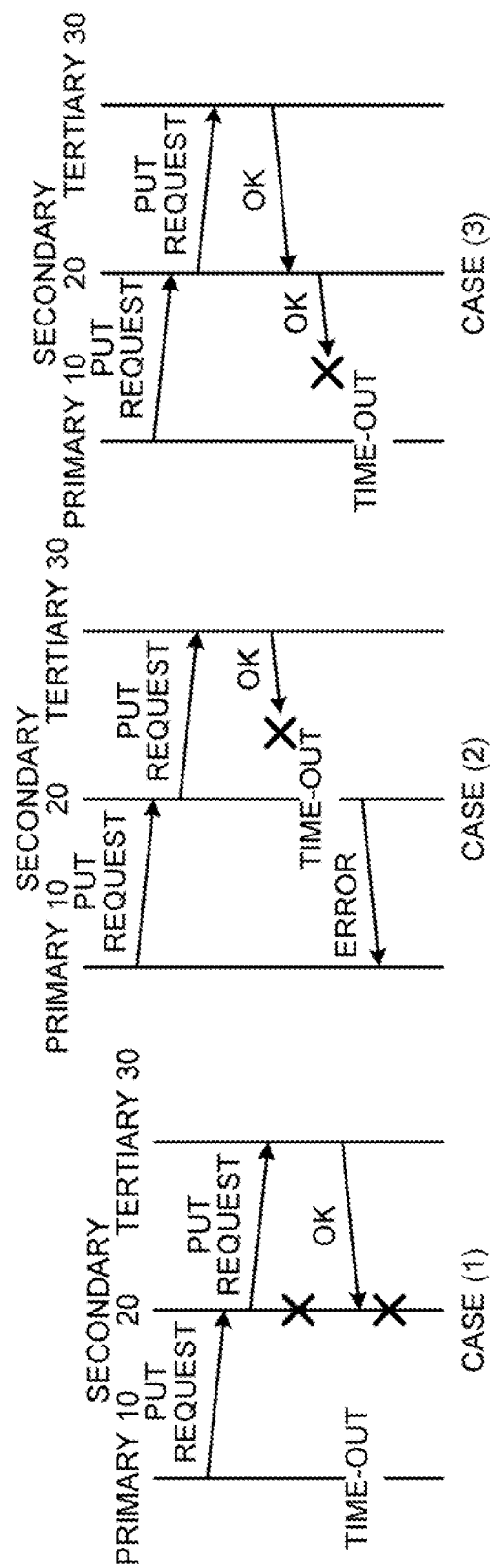

COMPUTER-READABLE RECORDING MEDIUM, DATA MANAGEMENT METHOD, AND STORAGE DEVICE

CROSS-REFERENCE TO RELATED APPLICATION

This application is based upon and claims the benefit of priority of the prior Japanese Patent Application No. 2011-263062, filed on Nov. 30, 2011, the entire contents of which are incorporated herein by reference.

FIELD

The embodiment discussed herein is directed to a data management program, a data management method, and a storage device.

BACKGROUND

Conventionally, there are several methods to put or get data in a distributed storage system, such as NoSQL typified by distributed KVS (Key Value Store), in which data is multiplexed into a plurality of nodes. The nodes here are computers including a CPU, a memory, or a disk device, etc., and the nodes are connected to one another via a network. Furthermore, the nodes in the distributed storage system are storage devices for storing therein data in a distributed manner. To put data here denotes to write data into the distributed storage system, and to get data denotes to read out data from the distributed storage system.

FIG. 12A is a diagram illustrating an example of a method to get data, and FIG. 12B is a diagram illustrating an example of a method to put data. In FIGS. 12A and 12B, data is tripled, and the tripled data are stored in nodes, respectively; there exists an order relation of "primary"→"secondary"→"tertiary" in the nodes. Here, "primary", "secondary", and "tertiary" denote roles for the nodes in a distributed storage system. A primary 10 is a node having the role of "primary", a secondary 20 is a node having the role of "secondary", and a tertiary 30 is a node having the role of "tertiary". Furthermore, a client 5 is a device that requests the distributed storage system to put or get data.

As illustrated in FIG. 12A, the client 5 can get data from any of the primary 10, the secondary 20, and the tertiary 30. Namely, when the client 5 requests any of the primary 10, the secondary 20, and the tertiary 30 to get data, the client 5 can get an OK from all of them.

On the other hand, the client 5 can request only the primary 10 to put as illustrated in FIG. 12B. A put request is transmitted in order of the client 5→the primary 10→the secondary 20→the tertiary 30, and "OK", a reply to the put request, is transmitted in reverse order of the tertiary 30→the secondary 20→the primary 10→the client 5.

Non-patent document 1: Robbert van Renesse, Fred B. Schneider, "Chain Replication for Supporting High Throughput and Availability", OSDI' 04:6th Symposium on Operating Systems Design and Implementation, P. 91.
Non-patent document 2: Jeff Terrace and Michael J. Freedman, "Object Storage on CRAQ High-throughput chain replication for read-mostly workloads", In Proc. USENIX Annual Technical Conference, San Diego, Calif., June 2009.

However, the conventional methods illustrated in FIGS. 12A and 12B have a problem that there may be a discrepancy among data held in the nodes. FIG. 13 is a diagram illustrating three cases of occurrence of the problem in the conventional methods.

A case (1) is a case where a failure has occurred in the secondary 20 after the secondary 20 transmitted a put request to the tertiary 30 but has not yet received a reply from the tertiary 30 or before the secondary 20, which has received the reply from the tertiary 30, sends a reply to the primary 10. In this case, the primary 10 detects a time-out; if data is not written at the time of time-out, old data is stored in the primary 10, and updated new data is stored in the tertiary 30.

A case (2) is a case where a temporary communication failure has occurred in a network at the time when the tertiary 30 sends a reply to the secondary 20, and a time-out occurred in the secondary 20. In this case, if data is not written at the time of time-out, old data is stored in the primary 10 and the secondary 20, and updated new data is stored in the tertiary 30.

A case (3) is a case where a temporary communication failure has occurred in the network at the time when the secondary 20 sends a reply to the primary 10, and a time-out occurred in the primary 10. In this case, if data is not written at the time of time-out, old data is stored in the primary 10, and updated new data is stored in the secondary 20 and the tertiary 30.

SUMMARY

According to an aspect of an embodiment, a non-transitory computer-readable recording medium stores a program. The program includes accepting a request to write update data of the data from either a first device, one of the other storage devices storing therein the data, or a client device; requesting a second device, one of the other storage devices storing therein the data other than the first device, to write the update data thereon; notifying the first device or client device that has requested to write the update data of writing failed due to failure occurrence when there is no reply from the second device within a predetermined time frame or when having notified of writing failed due to failure occurrence by the second device; and synchronizing the data among the other storage devices storing therein the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of data held in respective nodes in a case where each of the nodes has multiple roles;

FIG. 10 is a flowchart illustrating a processing procedure of a synchronization process in the case where each of the nodes has multiple roles;

FIG. 11 is a functional block diagram illustrating a configuration of a computer that executes a data management program according to the embodiment;

FIG. 13 is a diagram illustrating three cases of occurrence of a problem in a conventional method.

DESCRIPTION OF EMBODIMENT(S)

Preferred embodiments of the present invention will be explained with reference to accompanying drawings.

Figure 1:
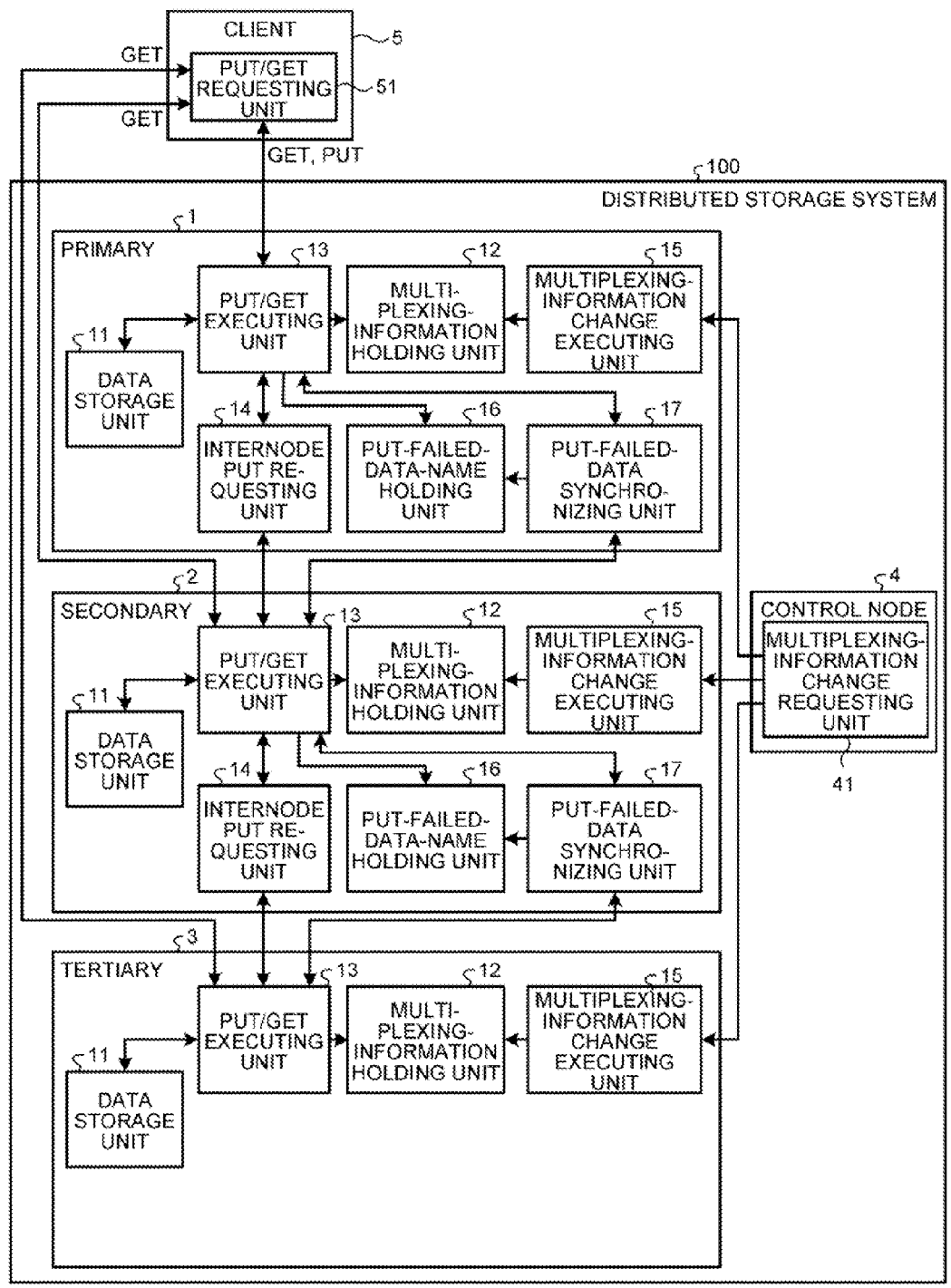
FIG. 1 is a functional block diagram illustrating a configuration of a distributed storage system according to an embodiment.

First, a configuration of a distributed storage system according to an embodiment is explained. FIG. 1 is a functional block diagram illustrating the configuration of the distributed storage system according to the embodiment. As illustrated in FIG. 1, a distributed storage system 100 includes a primary 1, a secondary 2, a tertiary 3, and a control node 4.

The primary 1 is a node having a role of "primary", the secondary 2 is a node having a role of "secondary", and the tertiary 3 is a node having a role of "tertiary". The primary 1, the secondary 2, the tertiary 3, and the control node 4 are connected to a network, and can communicate with one another via the network. Furthermore, the primary 1, the secondary 2, and the tertiary 3 are connected to the client 5 via a network.

The primary 1, the secondary 2, and the tertiary 3 store therein the same data. The client 5 is a device that does put data into the distributed storage system 100 and get data from the distributed storage system 100. The client 5 can request any of the primary 1, the secondary 2, and the tertiary 3 to get data; however, the client 5 can request only the primary 1 to put data. The put request is transmitted in order of the client 5→the primary 1→the secondary 2→the tertiary 3, and a reply to the put request is transmitted in order of the tertiary 3→the secondary 2→the primary 1→the client 5.

The client 5 includes a put/get requesting unit 51, and the put/get requesting unit 51 requests to put/get data into/from the distributed storage system 100. Incidentally, for convenience of the explanation, only one client 5 is illustrated in FIG. 1; however, the primary 1, the secondary 2, and the tertiary 3 are connected to a plurality of clients 5 via the network. Furthermore, the put request includes data requested to be written and a name of the data, and the get request includes a name of data requested to be read.

The primary 1 and the secondary 2 include a data storage unit 11, a multiplexing-information holding unit 12, a put/get executing unit 13, an internode put requesting unit 14, a multiplexing-information change executing unit 15, a put-failed-data-name holding unit 16, and a put-failed-data synchronizing unit 17. The tertiary 3 includes a data storage unit 11, a multiplexing-information holding unit 12, a put/get executing unit 13, and a multiplexing-information change executing unit 15.

The data storage unit 11 is a disk device storing therein data that the client 5 has put into the primary 1. The data that the client 5 has put into the primary 1 is multiplexed and stored in the respective data storage units 11 of the primary 1, the secondary 2, and the tertiary 3.

The multiplexing-information holding unit 12 holds therein multiplexing information. The multiplexing information here is information on multiplexing of data, and includes multiplexing chain information. The multiplexing chain information is information indicating the order of nodes in a multiplexing chain to which a put request and a reply to the put request are transmitted, and is information indicating, for example, the order in which the primary 1 is the first, the secondary 2 is the second, and the tertiary 3 is the last.

The put/get executing unit 13 executes a get request and a put request transmitted from the client 5 to the distributed storage system 100. As for a get request, the put/get executing unit 13 receives a get request directly from the client 5 and transmits data stored in the data storage unit 11 to the client 5. On the other hand, as for a put request, only the put/get executing unit 13 in the primary 1 receives a put request directly from the client 5, and the put/get executing units 13 in the other nodes receive the put request from the previous node in the order indicated in the multiplexing chain information. For example, the put/get executing unit 13 in the secondary 2 receives the put request from the primary 1, and the put/get executing unit 13 in the tertiary 3 receives the put request from the secondary 2. Furthermore, the put/get executing unit 13 writes data requested to be put on the data storage unit 11.

Moreover, when the node in which the put/get executing unit 13 is included is not the last node in the multiplexing chain information, the put/get executing unit 13 instructs the internode put requesting unit 14 to transmit the put request to the next node in the order indicated in the multiplexing chain information with reference to the multiplexing-information holding unit 12. For example, the put/get executing unit 13 in the primary 1 instructs the internode put requesting unit 14 to transmit the put request to the secondary 2, and the put/get executing unit 13 in the secondary 2 instructs the internode put requesting unit 14 to transmit the put request to the tertiary 3.

Furthermore, when having received a result of put from the next node in the order indicated in the multiplexing chain information via the internode put requesting unit 14, the put/get executing unit 13 writes the data on the data storage unit 11. Then, the put/get executing unit 13 notifies the previous node in the order indicated in the multiplexing chain information or the client 5 of the result of put.

However, when having notified of a put failure due to a time-out with respect to the put request by the internode put requesting unit 14, the put/get executing unit 13 stores a name of the data failed to be put in the put-failed-data-name holding unit 16, and instructs the put-failed-data synchronizing unit 17 to synchronize the data failed to be put. Incidentally, the tertiary 3 does not include the internode put requesting unit 14, so the put/get executing unit 13 in the tertiary 3 neither instructs to transmit the put request nor is notified of a put failure due to a time-out with respect to the put request.

Furthermore, the put/get executing unit 13 receives a get request for synchronization of data failed to be put due to a time-out from the put-failed-data synchronizing unit 17 in the previous node in the order indicated in the multiplexing chain information, and passes the received get request to the put-failed-data synchronizing unit 17 in the node in which the put/get executing unit 13 is included. However, the tertiary 3 does not include the put-failed-data synchronizing unit 17, so the put/get executing unit 13 in the tertiary 3 transmits data stored in the data storage unit 11 to the put-failed-data synchronizing unit 17 in the secondary 2.

Moreover, when having received data for synchronization from the put-failed-data synchronizing unit 17, the put/get executing unit 13 writes the received data on the data storage unit 11 and transmits the data for synchronization to the previous node in the order indicated in the multiplexing chain information. However, the put/get executing unit 13 in the primary 1 writes the received data on the data storage unit 11 and ends the synchronization process.

The internode put requesting unit 14 transmits a put request to the next node in the order indicated in the multiplexing chain information on the basis of an instruction from the put/get executing unit 13. Then, when having received a reply to the put request from the next node in the order indicated in the multiplexing chain information, the internode put requesting unit 14 notifies the put/get executing unit 13 of the reply.

Furthermore, when the internode put requesting unit 14 has received no reply to the put request transmitted to the next node in the order indicated in the multiplexing chain information within a predetermined time frame, the internode put requesting unit 14 notifies the put/get executing unit 13 of a put failure due to a time-out. In this manner, the internode put requesting unit 14 notifies the put/get executing unit 13 of a put failure due to a time-out, and therefore, the distributed storage system 100 can cope with a network or node failure occurred during the put process.

The multiplexing-information change executing unit 15 receives a request to change multiplexing information from the control node 4, and updates multiplexing information held in the multiplexing-information holding unit 12. The change of multiplexing information is made in the event of data movement between the nodes or any change in the roles that the nodes have due to a node failure, recovery from a node failure, or node relocation, etc.

The put-failed-data-name holding unit 16 holds therein a data name of data which has failed to be put and is in an asynchronous state as a put-failed data name. The put/get executing unit 13 locks a request to get data of which the data name is held in the put-failed-data-name holding unit 16 from the client 5, and sends an error, i.e., a put failure due to the occurrence of a failure to the client 5. Therefore, the distributed storage system 100 can prevent data being in an asynchronous state from being transmitted to the client 5.

The put-failed-data synchronizing unit 17 performs a process of synchronizing data failed to be put with reference to the put-failed-data-name holding unit 16. Namely, the put-failed-data synchronizing unit 17 specifies a data name and requests the put/get executing unit 13 in the next node in the order indicated in the multiplexing chain information to transmit data for synchronization, and passes the transmitted data for synchronization to the put/get executing unit 13 in the node in which the put-failed-data synchronizing unit 17 included. Furthermore, when the put/get executing unit 13 in the node in which the put-failed-data synchronizing unit 17 included has written the data for synchronization on the data storage unit 11, the put-failed-data synchronizing unit 17 deletes the data name from put-failed data names.

Incidentally, the synchronization process is initiated by the put-failed-data synchronizing unit 17 in the first node in the order indicated in the multiplexing chain information. The put-failed-data synchronizing units 17 in the other nodes perform the synchronization process upon receipt of a request to acquire data for synchronization from the put-failed-data synchronizing unit 17 in the previous node in the order indicated in the multiplexing chain information.

The control node 4 is a node that controls the distributed storage system 100, and includes a multiplexing-information change requesting unit 41. The multiplexing-information change requesting unit 41 requests each node to change the multiplexing information held in the node when there is any change in the multiplexing chain information or the like.

Figure 2:
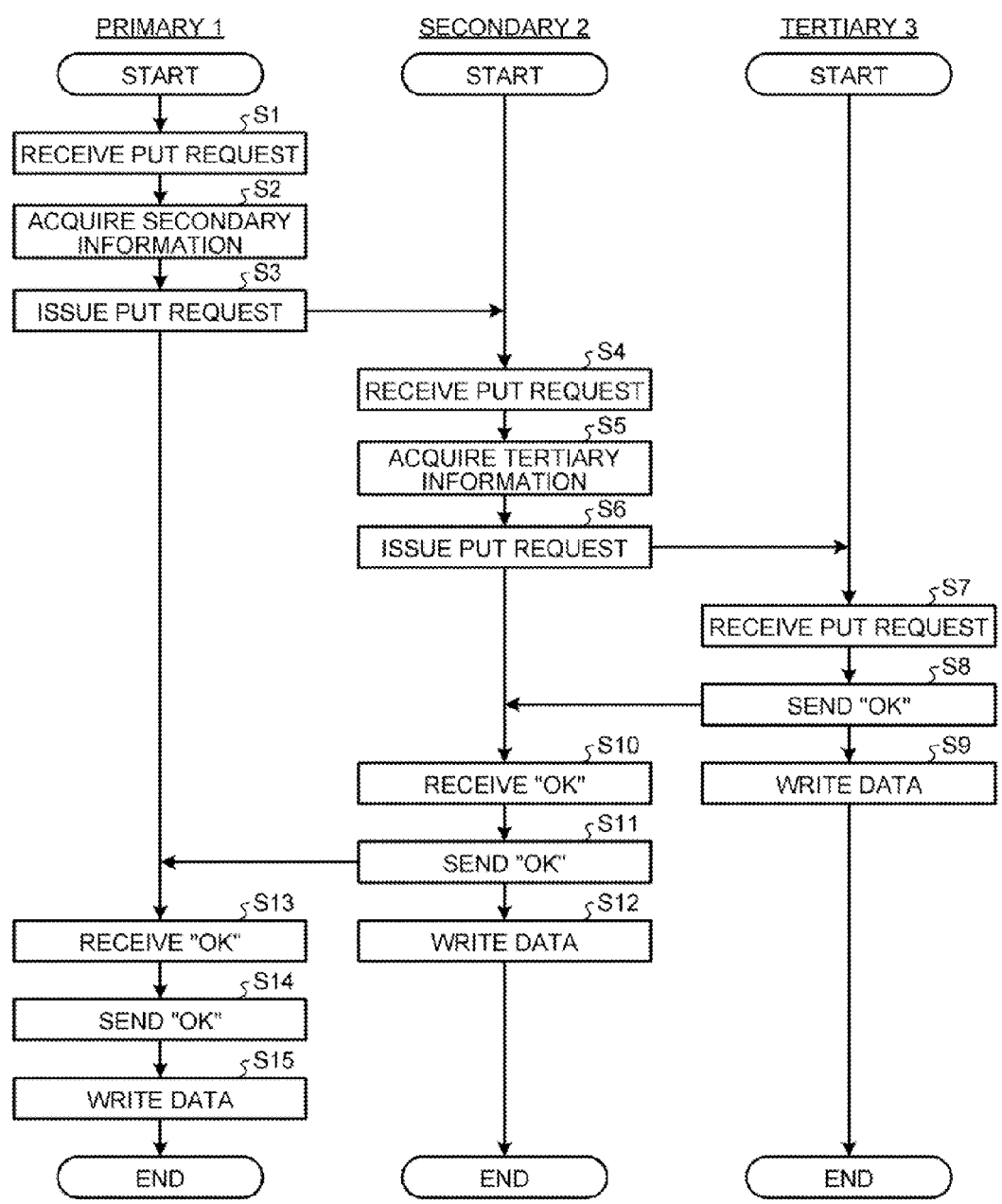
FIG. 2 is a flowchart illustrating a processing procedure of a normal put process performed by the distributed storage system according to the embodiment.

Subsequently, a procedure of normal processing of the distributed storage system 100 according to the embodiment is explained with reference to FIGS. 2 and 3. FIG. 2 is a flowchart illustrating a processing procedure of a normal put process performed by the distributed storage system 100 according to the embodiment. As illustrated in FIG. 2, when having received a put request from the client 5 (Step S1), the put/get executing unit 13 in the primary 1 acquires secondary information from the multiplexing-information holding unit 12 (Step S2). Then, the put/get executing unit 13 instructs the internode put requesting unit 14 to issue the same put request as the received put request to the secondary 2, and the internode put requesting unit 14 issues the put request to the secondary 2 (Step S3).

The put/get executing unit 13 in the secondary 2 receives the put request from the primary 1 (Step S4), and acquires tertiary information from the multiplexing-information holding unit 12 (Step S5). Then, the put/get executing unit 13 instructs the internode put requesting unit 14 to issue the same put request as the received put request to the tertiary 3, and the internode put requesting unit 14 issues the put request to the tertiary 3 (Step S6).

The put/get executing unit 13 in the tertiary 3 receives the put request from the secondary 2 (Step S7), and sends "OK" to the secondary 2 (Step S8) and writes data on the data storage unit 11 (Step S9).

Then, the internode put requesting unit 14 in the secondary 2 receives "OK" from the tertiary 3 (Step S10), and notifies the put/get executing unit 13 of "success". Then, the put/get executing unit 13 sends "OK" to the primary 1 (Step S11) and writes data on the data storage unit 11 (Step S12).

Then, the internode put requesting unit 14 in the primary 1 receives "OK" from the secondary 2 (Step S13), and notifies the put/get executing unit 13 of "success". Then, the put/get executing unit 13 sends "OK" to the client 5 (Step S14) and writes data on the data storage unit 11 (Step S15).

In this manner, the distributed storage system 100 performs chain-writing in order of, for example, the client 5→the primary 1→the secondary 2→the tertiary 3→the secondary 2→the primary 1→the client 5. Furthermore, during the put process, i.e., from initiation of the put process until completion of data writing on the data storage unit 11 through communication processing or the like, each node blocks any other put requests and get requests with respect to the same data.

Figure 3:
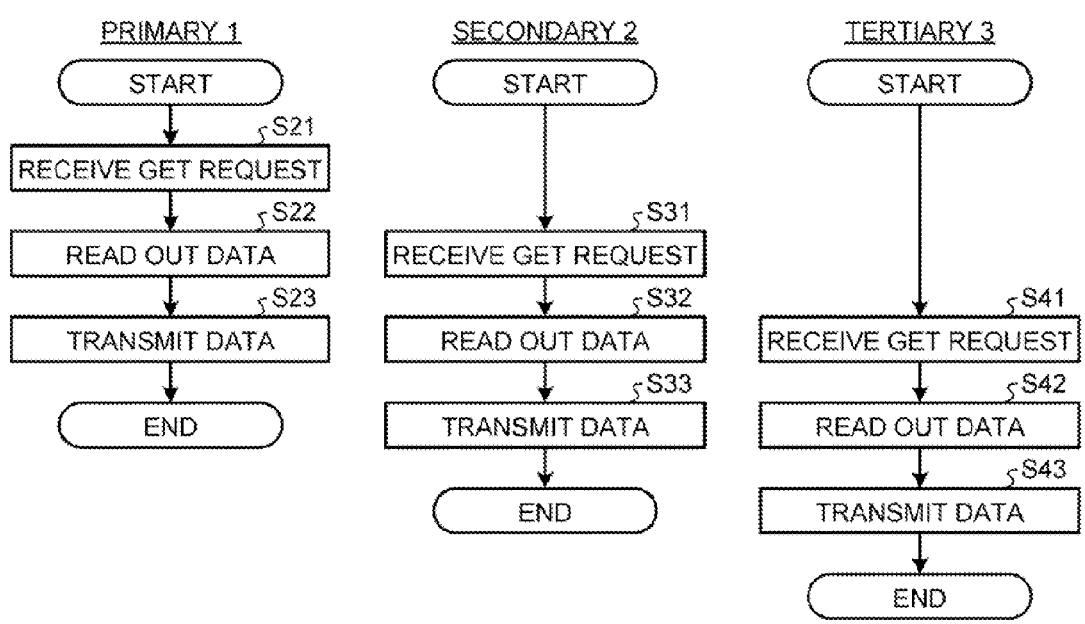
FIG. 3 is a flowchart illustrating a processing procedure of a normal get process performed by the distributed storage system according to the embodiment.

FIG. 3 is a flowchart illustrating a processing procedure of a normal get process performed by the distributed storage system 100 according to the embodiment. As illustrated in FIG. 3, when having received a get request from the client 5 (Steps S21, S31, and S41), the primary 1, the secondary 2, and the tertiary 3 read out data from the data storage unit 11 (Steps S22, S32, and S42). Then, the primary 1, the secondary 2, and the tertiary 3 transmit the read data to the client 5 (Steps S23, S33, and S43).

In this manner, the client 5 can get data from any of the primary 1, the secondary 2, and the tertiary 3. Furthermore, while a node is performing the get process, the other nodes can perform the get process with respect to the same data.

Incidentally, during a put process to write data into the distributed storage system 100, any other put requests and get requests with respect to the data are blocked, and a process responding to the next put request or get request is performed after completion of the first put process.

Figure 4:
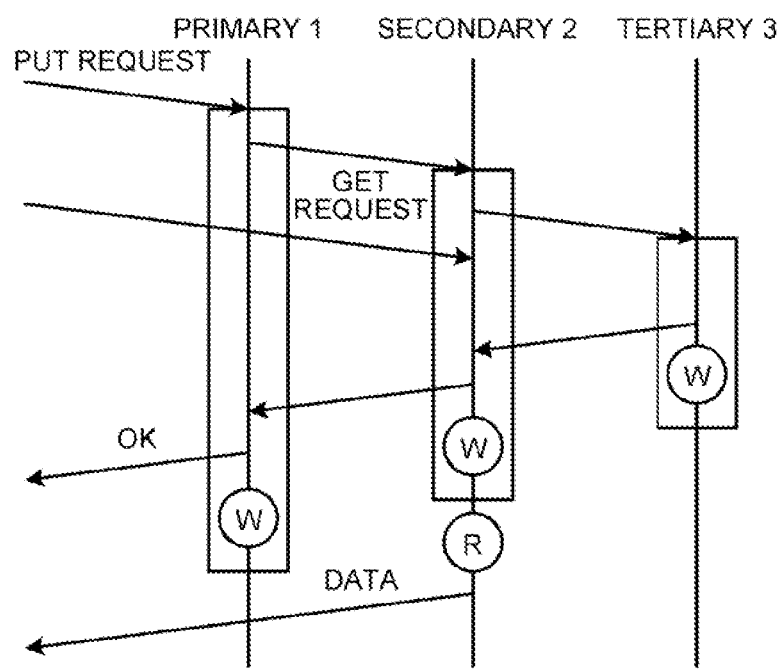
FIG. 4 is a diagram illustrating the flow of a process in a case where a secondary has received a get request during the put process.

FIG. 4 is a diagram illustrating the flow of a process in a case where the secondary 2 has received a get request during a put process. In FIG. 4, an encircled W denotes data writing on the data storage unit 11, and an encircled R denotes data reading from the data storage unit 11. Furthermore, a rectangular box denotes the put process. As illustrated in FIG. 4, the get request is blocked until the secondary 2 completes the put process, and is processed after completion of the put process, i.e., after the secondary 2 has sent a reply to the primary 1 and written data on the data storage unit 11. Consequently, the consistency of data in the normal state can be maintained.

Figure 5:
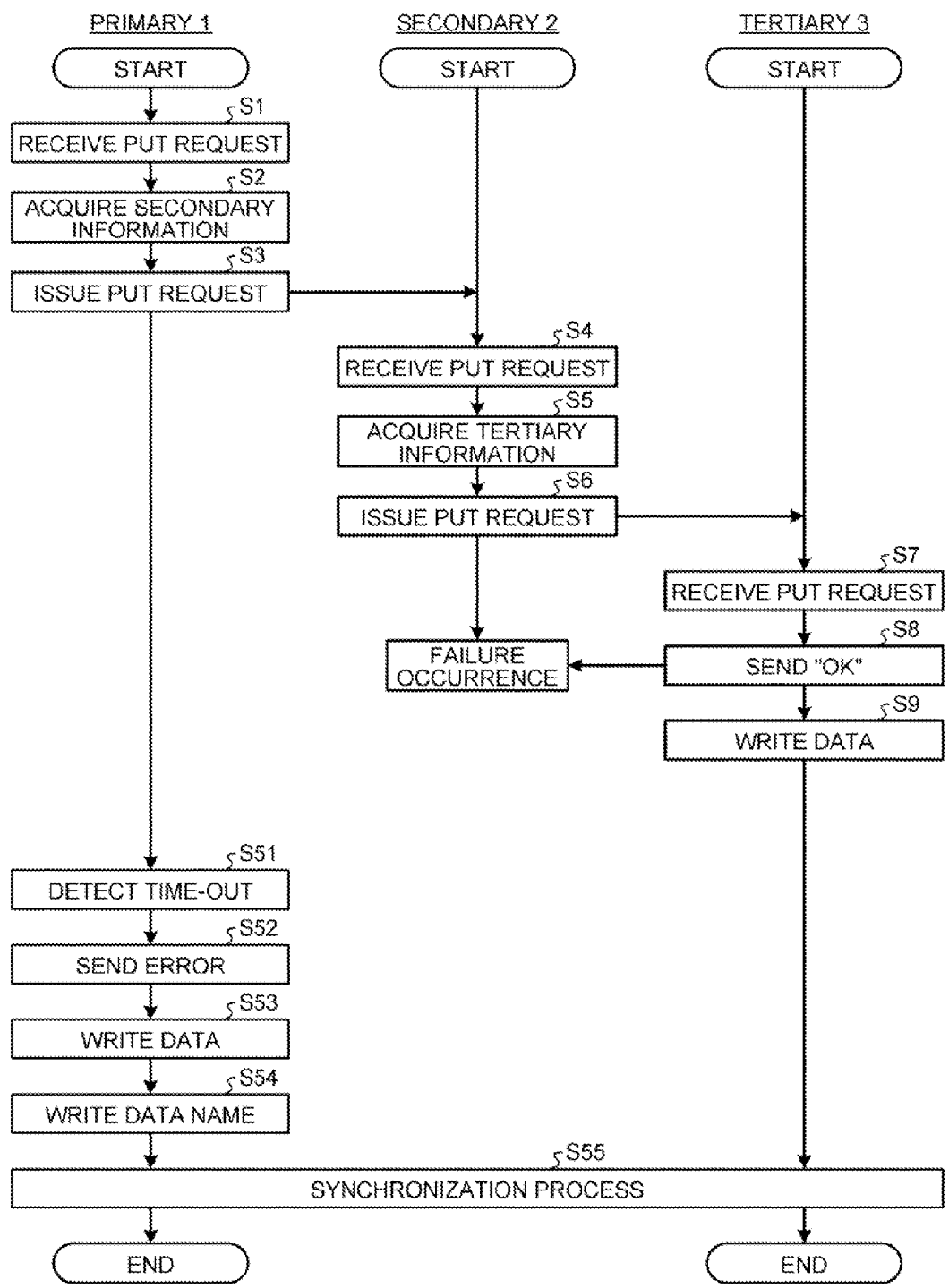
FIG. 5 is a first flowchart illustrating a processing procedure of an abnormal put process performed by the distributed storage system according to the embodiment.

Subsequently, a processing procedure when the distributed storage system 100 according to the embodiment is in an abnormal state is explained with reference to FIGS. 5 to 7. FIG. 5 is a first flowchart illustrating a processing procedure of an abnormal put process performed by the distributed storage system 100 according to the embodiment. Incidentally, Steps S1 to S9 in FIG. 5 are identical to those in FIG. 2, so description of these steps is omitted.

As illustrated in FIG. 5, when a failure has occurred in the secondary 2 at the time when the tertiary 3 sends "OK" to the secondary 2, the internode put requesting unit 14 in the primary 1 detects a time-out because of no reply to the put request received (Step S51).

Then, in the primary 1, the internode put requesting unit 14 notifies the put/get executing unit 13 of a "failure". Then, the put/get executing unit 13 sends an error due to the time-out to the client 5 (Step S52), and writes data requested to be put on the data storage unit 11 (Step S53).

Then, in the primary 1, the put/get executing unit 13 writes a data name of the data requested to be put on the put-failed-data-name holding unit 16 (Step S54), and instructs the put-failed-data synchronizing unit 17 to synchronize the data. Then, in the primary 1, the put-failed-data synchronizing unit 17 performs the synchronization process of the data in collaboration with the tertiary 3 with reference to the put-failed-data-name holding unit 16 (Step S55).

Incidentally, the synchronization process performed by the primary 1 fails immediately after failure occurrence due to the occurrence of a failure in the secondary 2; however, after a short time, the failure in the secondary 2 is detected, and the tertiary 3 is upgraded to the secondary 2. Then, the primary 1 initiates the synchronization process with respect to the former tertiary which has newly become the secondary.

Furthermore, until completion of the synchronization process, the primary 1 makes other put requests with respect to the data wait, and returns an error requesting for retry on a get request. When having received the error, the client 5 issues a get request to the tail end of the multiplexing chain. The get request to the tail end of the multiplexing chain is not blocked, so a node located at the tail end of the multiplexing chain can execute a get process.

In this manner, when a failure has occurred in the secondary 2 after the secondary 2 issued a put request to the tertiary 3, the primary 1 detects a time-out and initiates the synchronization process; therefore, the distributed storage system 100 can maintain the consistency of data.

Incidentally, here, there is described the case where a failure has occurred in the secondary 2 at the time when the tertiary 3 sends "OK" to the secondary 2. However, also in a case where a failure has occurred in the secondary 2 before the secondary 2 sends "OK" to the primary 1 upon receipt of "OK" from the tertiary 3, the primary 1 can detect a time-out and perform the synchronization process.

Figure 6:
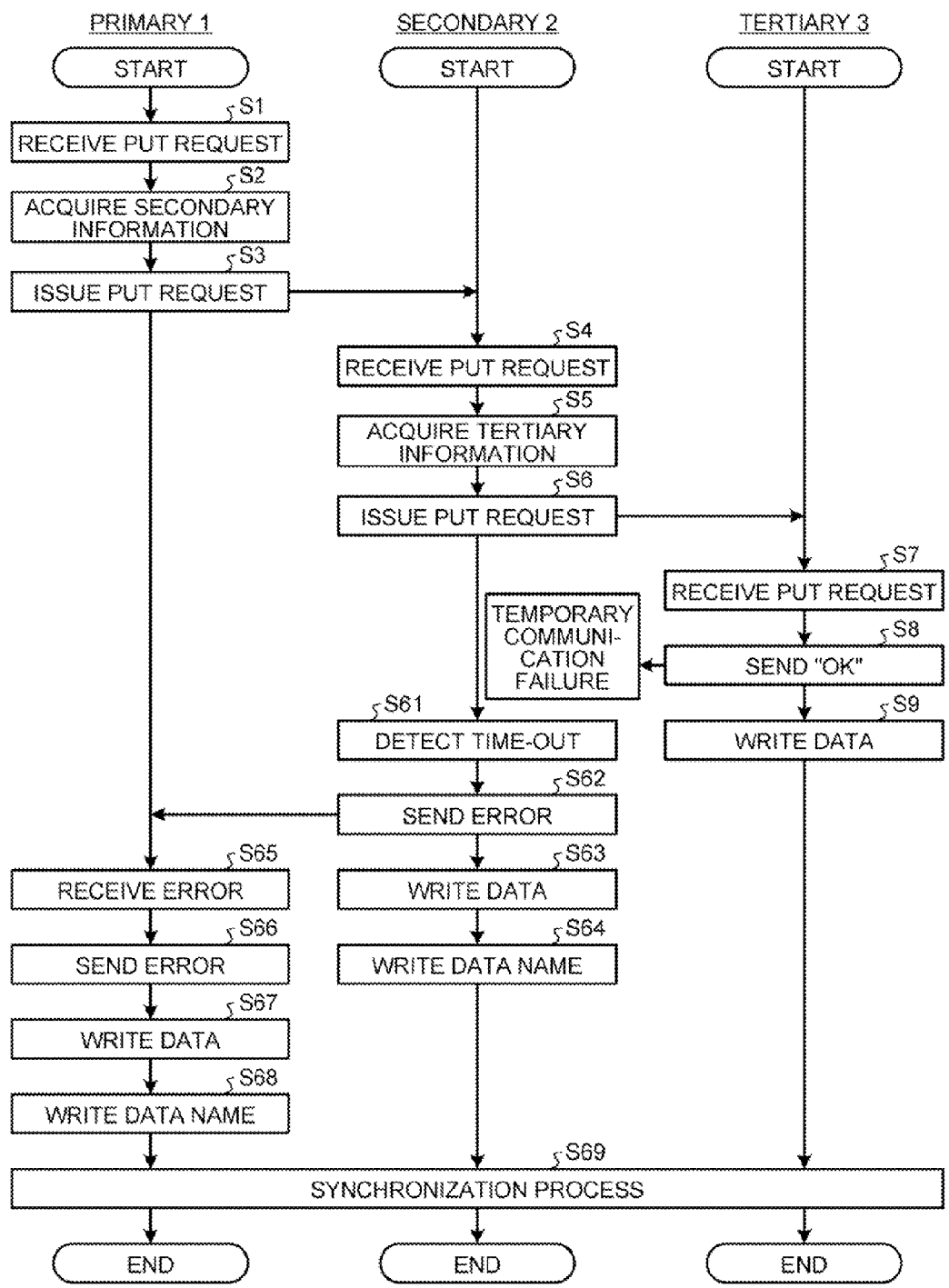
FIG. 6 is a second flowchart illustrating a processing procedure of an abnormal put process performed by the distributed storage system according to the embodiment.

FIG. 6 is a second flowchart illustrating a processing procedure of an abnormal put process performed by the distributed storage system 100 according to the embodiment. Incidentally, FIG. 6 illustrates the processing procedure upon occurrence of a failure in the case (2) illustrated in FIG. 13. Furthermore, Steps S1 to S9 in FIG. 6 are identical to those in FIG. 2, so description of these steps is omitted.

As illustrated in FIG. 6, when a temporary communication failure has occurred in the network at the time when the tertiary 3 sends a reply to the secondary 2, the internode put requesting unit 14 in the secondary 2 detects a time-out because of no reply to the put request received (Step S61).

Then, in the secondary 2, the internode put requesting unit 14 notifies the put/get executing unit 13 of a "failure". Then, in the secondary 2, the put/get executing unit 13 sends an error due to the time-out to the primary 1 (Step S62), and writes data requested to be put on the data storage unit 11 (Step S63). Then, in the secondary 2, the put/get executing unit 13 writes a data name of the data requested to be put on the put-failed-data-name holding unit 16 (Step S64).

Then, when having received the error due to the time-out (Step S65), the internode put requesting unit 14 in the primary 1 notifies the put/get executing unit 13 of the error. Then, in the primary 1, the put/get executing unit 13 sends the error due to the time-out to the client 5 (Step S66), and writes data requested to be put on the data storage unit 11 (Step S67). Then, in the primary 1, the put/get executing unit 13 writes a data name of the data requested to be put on the put-failed-data-name holding unit 16 (Step S68), and instructs the put-failed-data synchronizing unit 17 to synchronize the data. Then, the put-failed-data synchronizing unit 17 performs the synchronization process of the data in collaboration with the secondary 2 and the tertiary 3 with reference to the put-failed-data-name holding unit 16 (Step S69).

In this manner, when a temporary communication failure has occurred in the network at the time when the tertiary 3 sends a reply to the secondary 2, the secondary 2 detects a time-out and notifies the primary 1 of the time-out. Then, the primary 1 notified of the time-out initiates the synchronization process; therefore, the distributed storage system 100 can maintain the consistency of data.

Figure 7:
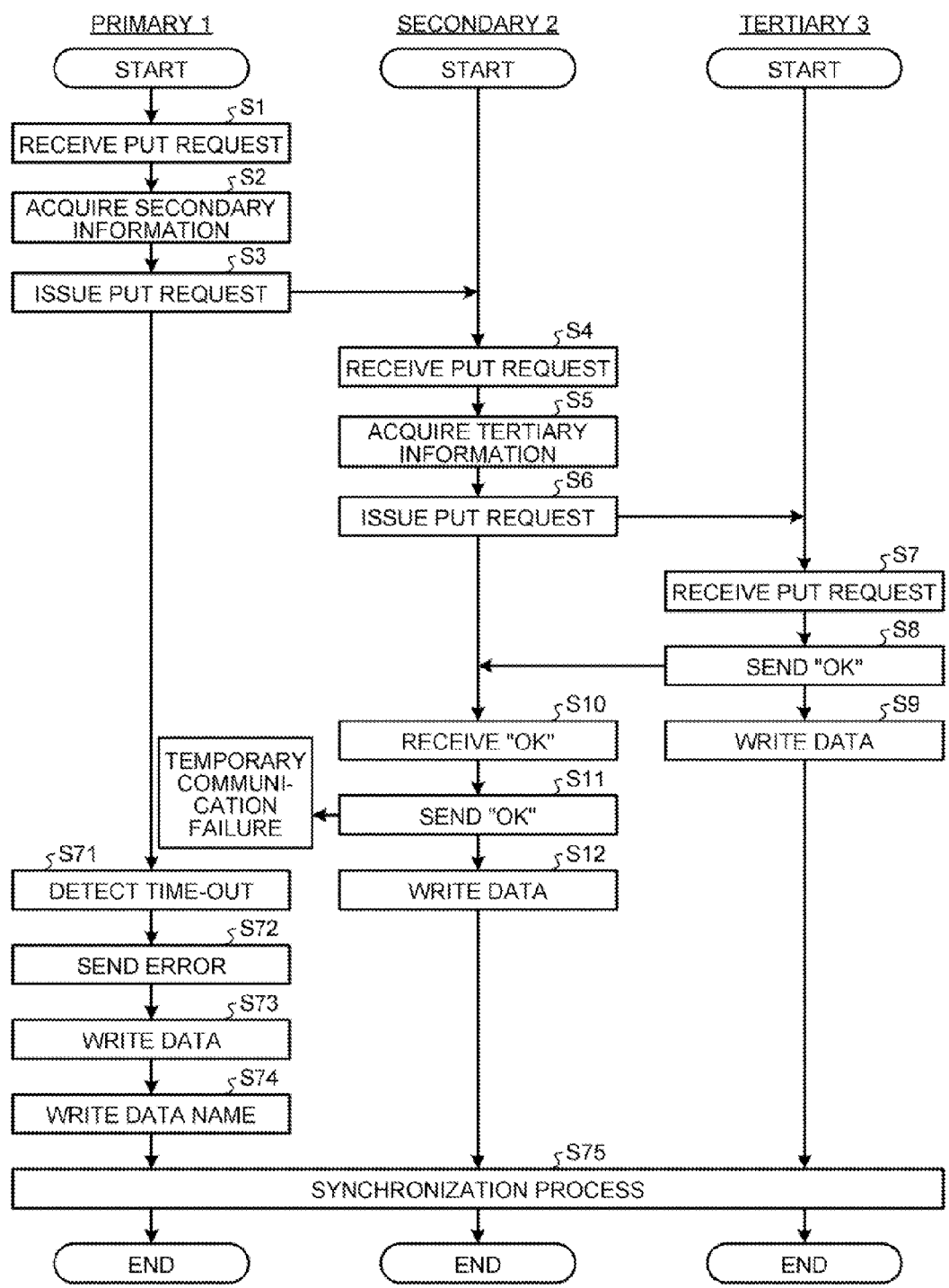
FIG. 7 is a third flowchart illustrating a processing procedure of an abnormal put process performed by the distributed storage system according to the embodiment.

FIG. 7 is a third flowchart illustrating a processing procedure of an abnormal put process performed by the distributed storage system 100 according to the embodiment. Incidentally, Steps S1 to S12 in FIG. 7 are identical to those in FIG. 2, so description of these steps is omitted.

As illustrated in FIG. 7, when a temporary communication failure has occurred in the network at the time when the secondary 2 sends a reply to the primary 1, the internode put requesting unit 14 in the primary 1 detects a time-out because of no reply to the put request received (Step S71).

Then, in the primary 1, the internode put requesting unit 14 notifies the put/get executing unit 13 of a "failure". Then, the put/get executing unit 13 sends an error due to the time-out to the client 5 (Step S72), and writes data requested to be put on the data storage unit 11 (Step S73). Then, in the primary 1, the put/get executing unit 13 writes a data name of the data requested to be put on the put-failed-data-name holding unit 16 (Step S74), and instructs the put-failed-data synchronizing unit 17 to synchronize the data. Then, in the primary 1, the put-failed-data synchronizing unit 17 performs the synchronization process of the data in collaboration with the secondary 2 and the tertiary 3 with reference to the put-failed-data-name holding unit 16 (Step S75).

In this manner, when a temporary communication failure has occurred in the network at the time when the secondary 2 sends a reply to the primary 1, the primary 1 detects a time-out and initiates the synchronization process; therefore, the distributed storage system 100 can maintain the consistency of data.

Figure 8:
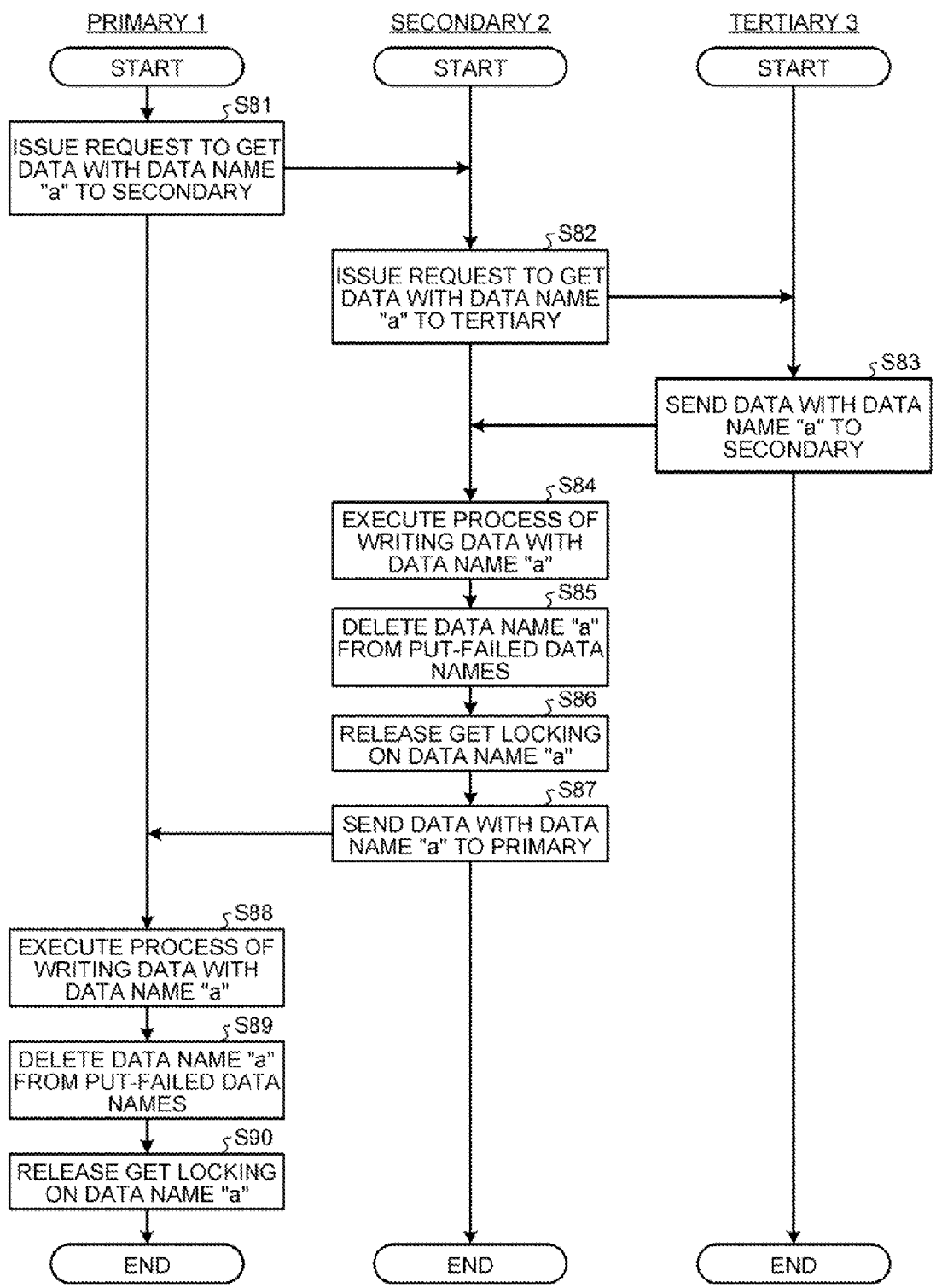
FIG. 8 is a flowchart illustrating a processing procedure of a synchronization process.
Figure 12A:
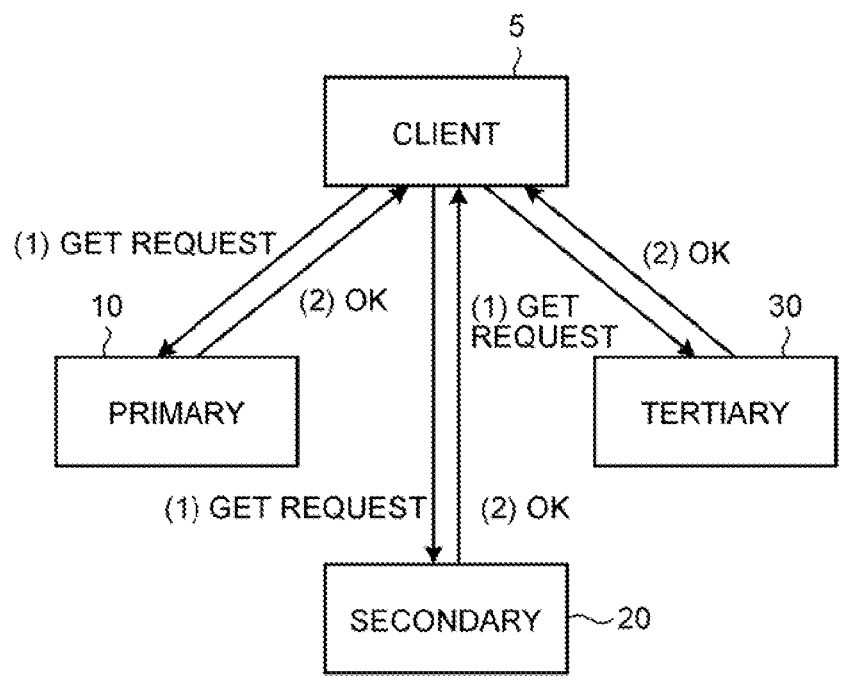
FIG. 12A is a diagram illustrating an example of a method to get data.
Figure 12B:
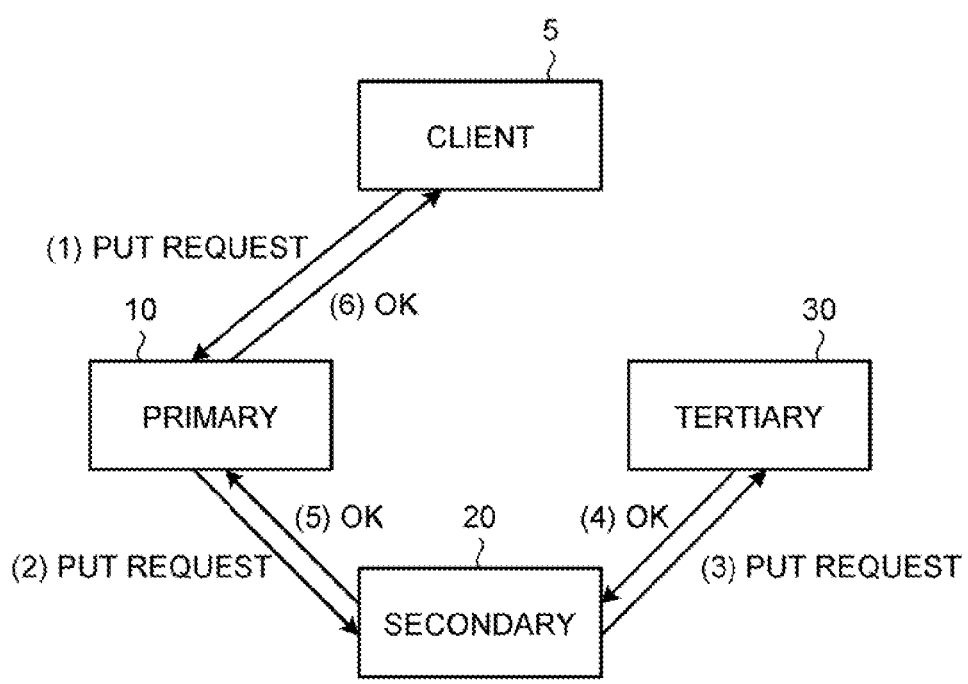
FIG. 12B is a diagram illustrating an example of a method to put data.

Subsequently, a processing procedure of the synchronization process is explained. FIG. 8 is a flowchart illustrating the processing procedure of the synchronization process. Incidentally, in FIG. 8, the primary 1 and the secondary 2 store "a" as a data name of data failed to be put in the respective put-failed-data-name holding units 16, and the primary 1, the secondary 2, and the tertiary 3 perform synchronization of the data.

As illustrated in FIG. 8, the put-failed-data synchronizing unit 17 in the primary 1 issues a request to get data with a data name "a" to the secondary 2 (Step S81). Then, the put/get executing unit 13 in the secondary 2 instructs the put-failed-data synchronizing unit 17 in the secondary 2 to issue the get request to the tertiary 3, and the put-failed-data synchronizing unit 17 in the secondary 2 issues the request to get data with the data name "a" to the tertiary 3 (Step S82).

Then, the put/get executing unit 13 in the tertiary 3 reads out data with the data name "a" from the data storage unit 11 and sends the read data to the secondary 2 (Step S83). Then, the put-failed-data synchronizing unit 17 in the secondary 2 receives the data and passes the received data to the put/get executing unit 13 in the secondary 2, and the put/get executing unit 13 in the secondary 2 executes a process of writing the data on the data storage unit 11 (Step S84).

Furthermore, the put-failed-data synchronizing unit 17 in the secondary 2 deletes the data name "a" from put-failed data names held in the put-failed-data-name holding unit 16 (Step S85), and releases the get locking on the data name "a" (Step S86). Then, the put/get executing unit 13 in the secondary 2 sends the data with the data name "a" to the primary 1 (Step S87).

Then, the put-failed-data synchronizing unit 17 in the primary 1 receives the data and passes the received data to the put/get executing unit 13 in the primary 1, and the put/get executing unit 13 in the primary 1 executes a process of writing the data on the data storage unit 11 (Step S88).

Furthermore, the put-failed-data synchronizing unit 17 in the primary 1 deletes the data name "a" from put-failed data names held in the put-failed-data-name holding unit 16 (Step S89), and releases the get locking on the data name "a" (Step S90).

In this manner, the primary 1, the secondary 2, and the tertiary 3 perform the synchronization process, and therefore, the distributed storage system 100 can maintain the consistency of data failed to be put.

As described above, in the embodiment, the internode put requesting unit 14 detects a time-out with respect to a put request issued to the next node in the order of the multiplexing chain, and notifies the put/get executing unit 13 of the time-out. Then, the put/get executing unit 13 sends an error to the previous node in the order of the multiplexing chain or the client 5 and instructs the put-failed-data synchronizing unit 17 to synchronize data failed to be put, and the put-failed-data synchronizing unit 17 performs the synchronization process. Therefore, the distributed storage system 100 can maintain the consistency of data even upon occurrence of a failure in a node or a temporary communication failure in the network during a put process.

Incidentally, until completion of the synchronization process, the primary 1 makes other put requests wait, and returns an error on a get request. Furthermore, when having received the error on the get request, the client 5 issues a get request to the tail end of the multiplexing chain. Therefore, the distributed storage system 100 can constantly return consistent data to the client 5 without keeping unnecessary data in each node.

Incidentally, in the embodiment, there is described the case where each node has any one of the roles of "primary", "secondary", and "tertiary". However, each node can have multiple roles, and can play a different role with respect to each piece of data. The synchronization process in the case where each node can have multiple roles is explained with reference to FIGS. 9 and 10.

FIG. 9 is a diagram illustrating an example of data held in respective nodes in a case where each of the nodes has multiple roles. In FIG. 9, a slot denotes a divided namespace of a data name, which slot data belongs to is uniquely determined from a data name. In FIG. 9, a namespace is divided into three slots: slot-1, slot-2, and slot-3.

Then, a node A plays a role of "primary" with respect to data belonging to a slot-1, and plays a role of "tertiary" with respect to data belonging to a slot-2, and then plays a role of "secondary" with respect to data belonging to a slot-3. Furthermore, a node B plays a role of "secondary" with respect to data belonging to a slot-1, and plays a role of "primary" with respect to data belonging to a slot-2, and then plays a role of "tertiary" with respect to data belonging to a slot-3. Moreover, a node C plays a role of "tertiary" with respect to data belonging to a slot-1, and plays a role of "secondary" with respect to data belonging to a slot-2, and then plays a role of "primary" with respect to data belonging to a slot-3.

In the event of data movement between nodes or any change in roles that a node has due to a node failure, recovery from a node failure, or node relocation, etc., the data movement or change in roles is made by slot. For example, the role of "primary" with respect to the slot-1 may be changed from the role for the node A to the role for a new node D by node relocation. Furthermore, such data movement between nodes or change in roles that a node has due to a node failure, recovery from a node failure, or node relocation, etc. occurs during the synchronization process. Therefore, movement of a put-failed data name also occurs during the synchronization process.

Accordingly, the put-failed-data-name holding unit 16 in each node holds put-failed data names with respect to each slot. For example, as illustrated in FIG. 9, the node A holds "a", "b", "c", "y", and "z" as put-failed data names with respect to the data belonging to the slot-1, and holds "moge" as a put-failed data name with respect to the data belonging to the slot-3. However, the node A plays the role of "tertiary", i.e., the tail end of a multiplexing chain with respect to the data belonging to the slot-2, so the node A holds no put-failed data name with respect to the slot-2. If the role of "primary" with respect to the slot-1 is changed from the role for the node A to the role for a new node D by node relocation, and the data of the slot-1 is copied from the node A onto the node D, the put-failed data names belonging to the slot-1 of the node A are moved onto the node D and removed from the node A.

Furthermore, in the condition of the slot-2 illustrated in FIG. 9, when a failure has occurred in the node A serving as the "tertiary", and the node C serving as the "secondary" becomes the tail end of the multiplexing chain, a data name "aa" is deleted from the put-failed data names. This is because data located at the tail end of the multiplexing chain is considered as correct data. In this manner, the put-failed-data-name holding unit 16 holds put-failed data names with respect to each slot, so the distributed storage system 100 can efficiently make a change to data to be synchronized arising at the time of node relocation or the like.

FIG. 10 is a flowchart illustrating a processing procedure of the synchronization process in the case where each of the nodes has multiple roles. Incidentally, in FIG. 10, with respect to a data name "xyz" belonging to the slot-3, the node C operates as the primary 1, the node A operates as the secondary 2, and the node B operates as the tertiary 3. Furthermore, only the node C holds "xyz" as a data name of data failed to be put in the put-failed-data-name holding unit 16 thereof.

As illustrated in FIG. 10, the put-failed-data synchronizing unit 17 in the node C operating as the primary 1 issues a get request to get data with a data name "xyz" to the node A operating as the secondary 2 (Step S91). Then, the put/get executing unit 13 in the node A instructs the put-failed-data synchronizing unit 17 in the node A to issue the get request to the node B operating as the tertiary 3, and the put-failed-data synchronizing unit 17 in the node A issues the get request to get data with a data name "xyz" to the node B (Step S92).

Then, the put/get executing unit 13 in the node B reads out data with the data name "xyz" from the data storage unit 11 and sends the read data to the node A (Step S93). Then, the put-failed-data synchronizing unit 17 in the node A receives the data and passes the received data to the put/get executing unit 13 in the node A, and the put/get executing unit 13 in the node A sends the data with the data name "xyz" to the node C (Step S94).

Then, the put-failed-data synchronizing unit 17 in the node C receives the data and passes the received data to the put/get executing unit 13 in the node C, and the put/get executing unit 13 in the node C executes a process of writing the data on the data storage unit 11 (Step S95).

Furthermore, the put-failed-data synchronizing unit 17 in the node C deletes the data name "xyz" included in the slot-3 from put-failed data names held in the put-failed-data-name holding unit 16 (Step S96), and releases the get locking on the data name "xyz" (Step S97).

In this manner, each node plays a different role by slot, so a different node initiates the synchronization process from slot to slot.

In the above embodiment, the node is described as a storage device; in addition, a data management program having the same function as the node can be achieved by implementing the configuration of the node in software. A computer that executes the data management program is explained below.

FIG. 11 is a functional block diagram illustrating a configuration of the computer that executes the data management program according to the embodiment. As illustrated in FIG. 11, a computer 200 includes a RAM 210, a CPU 220, an HDD 230, a LAN interface 240, an input/output interface 250, and a DVD drive 260.

The RAM 210 is a memory that stores therein a program and an intermediate execution result of the program being in execution, and the like; the CPU 220 is a central processing unit that reads out the program from the RAM 210 and executes the read program. The HDD 230 is a disk device that stores therein a program and data, and stores therein data put by the client 5. The LAN interface 240 is an interface for connecting the computer 200 to another computer via a LAN. The input/output interface 250 is an interface for connecting input devices, such as a mouse and a keyboard, and a display device to the computer 200; the DVD drive 260 is a device for reading and writing data on a DVD.

A data management program 211 executed on the computer 200 is stored on a DVD, and is read out from the DVD by the DVD drive 260 and installed on the computer 200. Or, the data management program 211 is stored in a database or the like of another computer system connected to the computer 200 via the LAN interface 240, and is read out from the database and installed on the computer 200. Then, the installed data management program 211 is stored in the HDD 230, and loaded into the RAM 210 and executed by the CPU 220.

Furthermore, in the above embodiment, there is described the case where data stored in the tertiary 3 is transferred to the primary 1 in the synchronization process. However, another method can be used in the synchronization process. For example, a version number or the like is assigned to each piece of data, and, first, a version number stored in the tertiary 3 is transferred to the primary 1. Then, only when the primary 1 does not have data identified by the version number, the data is transferred from the tertiary 3 to the primary 1. In this manner, by dividing the synchronization process into two phases, the distributed storage system can reduce an amount of data transferred in the synchronization process.

Moreover, in the above embodiment, the put/get executing unit 13 sends a reply to a source of a put request and then executes data writing on the data storage unit 11. However, before sending a reply, the put/get executing unit 13 can execute data writing on the data storage unit 11. The timing to write data on the data storage unit 11 is sometimes determined statically and sometimes determined dynamically in response to a change in the multiplexing level with a failure of a storage device. For example, it can be configured that the put/get executing unit 13 normally sends a reply and then executes data writing on the data storage unit 11, and only when the multiplexing level is 1, the put/get executing unit 13 executes data writing on the data storage unit 11 before sending a reply.

Furthermore, in the above embodiment, there is described the case where the distributed storage system 100 includes three nodes; however, the present invention is not limited to this case, and can be also applied to a case where a distributed storage system includes four or more nodes.

Namely, the present invention can be also applied to a case where there are multiple secondaries 2 between the primary 1 and the tertiary 3. In this case, when a failure has occurred in any of the multiple secondaries 2, the previous node in the order of the multiplexing chain detects a time-out, and notifies the primary 1 of an error due to the time-out through the previous nodes in reverse order of the multiplexing chain. Then, the primary 1 performs the synchronization process among nodes other than the node in which the failure has occurred. Furthermore, when a temporary communication failure has occurred in a network connecting between two secondaries in the multiple secondaries 2, a time-out is detected by a secondary 2 that has issued a put request. Then, the secondary 2 that has detected the time-out notifies the primary 1 of an error due to the time-out through the previous nodes in reverse order of the multiplexing chain. Then, when the network has been recovered from the temporary communication failure, the primary 1 performs the synchronization process among the other nodes.

Furthermore, in the above embodiment, there is described the case where the distributed storage system 100 includes three nodes; however, the present invention is not limited to this case, and can be also applied to a case where a distributed storage system includes two nodes. Namely, when the distributed storage system includes the primary 1 and the tertiary 3, and a temporary communication failure has occurred in a network connecting between the primary 1 and the tertiary 3, a time-out is detected by the primary 1 that has issued a put request. Then, when the network has been recovered from the temporary communication failure, the primary 1 that has detected the time-out performs the synchronization process with the tertiary 3.

According to one aspect of the present invention, it is possible to suppress the occurrence of a discrepancy among data held in nodes.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a data management program, the data management program causing a computer functioning as a storage device storing therein the same data as other storage devices to execute a process comprising:
    accepting a request to write update data of the data from either a first device, one of the other storage devices storing therein the data, or a client device;
    requesting a second device, one of the other storage devices storing therein the data other than the first device, to write the update data thereon;
    notifying the first device or client device that has requested to write the update data of writing failed due to failure occurrence when there is no reply from the second device within a predetermined time frame or when having notified of writing failed due to failure occurrence by the second device;
    synchronizing the data among the other storage devices storing therein the data; and
    returning, until completion of the synchronization of the data, an error requesting for retry on a read request.

2. The non-transitory computer-readable recording medium having stored therein the data management program according to claim 1, wherein
    the accepting accepts the request to write the update data from the client device;
    the notifying notifies the client device that has requested to write the update data of writing failed due to failure occurrence when there is no reply from the second device within the predetermined time frame or when having notified of writing failed due to failure occurrence by the second device; and further execute
    making other requests from the client device to write the data wait until completion of the synchronization of the data.

3. The non-transitory computer-readable recording medium having stored therein the data management program according to claim 1, wherein the data management program causes the computer to further execute a process comprising:
    storing therein a data identifier identifying the data when there is no reply from the second device within the predetermined time frame or when having notified of writing failed due to failure occurrence by the second device, the storing stores the data identifier with respect to each slot denoting a divided namespace of the data identifier, and
    the synchronizing synchronizes the data among the other storage devices using the data identifier stored by slot.

4. A data management method implemented by a storage device storing therein the same data as other storage devices, the method comprising:
    accepting a request to write update data of the data from either a first device, one of the other storage devices storing therein the data, or a client device;
    requesting a second device, one of the other storage devices storing therein the data other than the first device, to write the update data thereon;
    notifying, using a processor, the first device or client device that has requested to write the update data of writing failed due to failure occurrence when there is no reply from the second device within a predetermined time frame or when having notified of writing failed due to failure occurrence by the second device;
    synchronizing, using a processor, the data among the other storage devices storing therein the data; and
    returning, until completion of the synchronization of the data, an error requesting for retry on a read request.

5. A storage device that stores therein the same data as other storage devices, the storage device comprising:
    a memory; and
    a processor coupled to the memory, wherein the processor executes a process comprising:
    accepting a request to write update data of the data from either a first device, one of the other storage devices storing therein the data, or a client device;
    requesting a second device, one of the other storage devices storing therein the data other than the first device, to write the update data thereon;
    notifying the first device or client device that has requested to write the update data of writing failed due to failure occurrence when there is no reply from the second device within a predetermined time frame or when having notified of writing failed due to failure occurrence by the second device;
    synchronizing the data among the other storage devices storing therein the data; and
    returning, until completion of the synchronization of the data, an error requesting for retry on a read request.

* * * * *